(12) United States Patent
Hong et al.

(10) Patent No.: US 11,490,270 B2
(45) Date of Patent: Nov. 1, 2022

(54) APPARATUS AND METHODS FOR MEASURING BEAMS DURING MOBILITY IN WIRELESS COMMUNICATIONS

(71) Applicant: QUALCOMM Incorporated, San Diego, CA (US)

(72) Inventors: Yue Hong, San Diego, CA (US); Yuanbo Wang, San Diego, CA (US); Viswanath Sankaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 17/123,934

(22) Filed: Dec. 16, 2020

(65) Prior Publication Data

US 2021/0195436 A1 Jun. 24, 2021

Related U.S. Application Data

(60) Provisional application No. 62/949,963, filed on Dec. 18, 2019.

(51) Int. Cl.
*H04W 16/28* (2009.01)
*H04W 36/06* (2009.01)
*H04W 24/10* (2009.01)
*H04B 7/06* (2006.01)

(52) U.S. Cl.
CPC .......... *H04W 16/28* (2013.01); *H04B 7/0695* (2013.01); *H04W 24/10* (2013.01); *H04W 36/06* (2013.01)

(58) Field of Classification Search
CPC ..... H04W 16/28; H04W 24/10; H04W 36/06; H04B 7/0695
See application file for complete search history.

(56) References Cited

U.S. PATENT DOCUMENTS

| 9,900,891 | B1 * | 2/2018 | Islam | H04W 72/046 |
| 2020/0022040 | A1 * | 1/2020 | Chen | H04W 76/27 |
| 2021/0111783 | A1 * | 4/2021 | Zhang | H04L 1/1822 |
| 2021/0243814 | A1 * | 8/2021 | Zhang | H04W 74/0833 |
| 2021/0266134 | A1 * | 8/2021 | Axmon | H04B 7/0617 |

FOREIGN PATENT DOCUMENTS

WO WO-2021032124 A1 * 2/2021 ........... H04B 7/0695

* cited by examiner

*Primary Examiner* — Deepa Belur
(74) *Attorney, Agent, or Firm* — Arent Fox LLP/Qualcomm Incorporated

(57) ABSTRACT

Some aspects described herein relate to performing a serving beam switch from a first serving beam to a second serving beam, and switching, for an inter-frequency procedure and based on one or more spatial correlation parameters associated with the first serving beam and second serving beam, from a first inter-frequency beam to a second inter-frequency beam to use in the inter-frequency procedure.

30 Claims, 6 Drawing Sheets

APPARATUS AND METHODS FOR MEASURING BEAMS DURING MOBILITY IN WIRELESS COMMUNICATIONS

CLAIM OF PRIORITY UNDER 35 U.S.C. § 119

The present application for patent claims priority to Provisional Patent Application No. 62/949,963, entitled "TECHNIQUES FOR MEASURING BEAMS DURING MOBILITY IN WIRELESS COMMUNICATIONS" filed Dec. 18, 2019, which is assigned to the assignee hereof and hereby expressly incorporated by reference herein for all purposes.

BACKGROUND

Aspects of the present disclosure relate generally to wireless communication systems, and more particularly, to beamforming communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, nodes communicating with one another can beamform communications such as transmit signals in certain spatial directions and/or receive signals in certain spatial directions to improve hearability and/or quality of the communications. For example, the nodes can apply a beamforming matrix to selectively apply power to antenna resources to obtain the spatial direction for transmitting and/or receiving signals. In addition, nodes can periodically measure signals in different beam directions to determine a desirable beam to use in communicating with one or more other nodes.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes performing a serving beam switch from a first serving beam to a second serving beam, and switching, for an inter-frequency procedure and based on one or more spatial correlation parameters associated with the first serving beam and second serving beam, from a first inter-frequency beam to a second inter-frequency beam to use in the inter-frequency procedure.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods and examples described above and further herein. In another aspect, an apparatus for wireless communication is provided that includes means for performing the operations of methods and examples described above and further herein. In yet another aspect, a computer-readable medium is provided including code executable by one or more processors to perform the operations of methods and examples described above and further herein.

In another aspect, an apparatus for wireless communication is provided that includes a transceiver, a memory configured to store instructions, and one or more processors communicatively coupled with the transceiver and the memory. The one or more processors are configured to perform a serving beam switch from a first serving beam to a second serving beam, and switch, for an inter-frequency procedure and based on one or more spatial correlation parameters associated with the first serving beam and the second serving beam, from a first inter-frequency beam to a second inter-frequency beam to use in performing the inter-frequency procedure.

In another aspect, an apparatus for wireless communication is provided that includes means for performing a serving beam switch from a first serving beam to a second serving beam, and means for switching, for an inter-frequency procedure and based on one or more spatial correlation parameters associated with the first serving beam and the second serving beam, from a first inter-frequency beam to a second inter-frequency beam to use in performing the inter-frequency procedure.

In another aspect, a computer-readable medium including code executable by one or more processors for wireless communication is provided. The code includes code for performing a serving beam switch from a first serving beam to a second serving beam, and switching, for an inter-frequency procedure and based on one or more spatial correlation parameters associated with the first serving beam and the second serving beam, from a first inter-frequency beam to a second inter-frequency beam to use in performing the inter-frequency procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
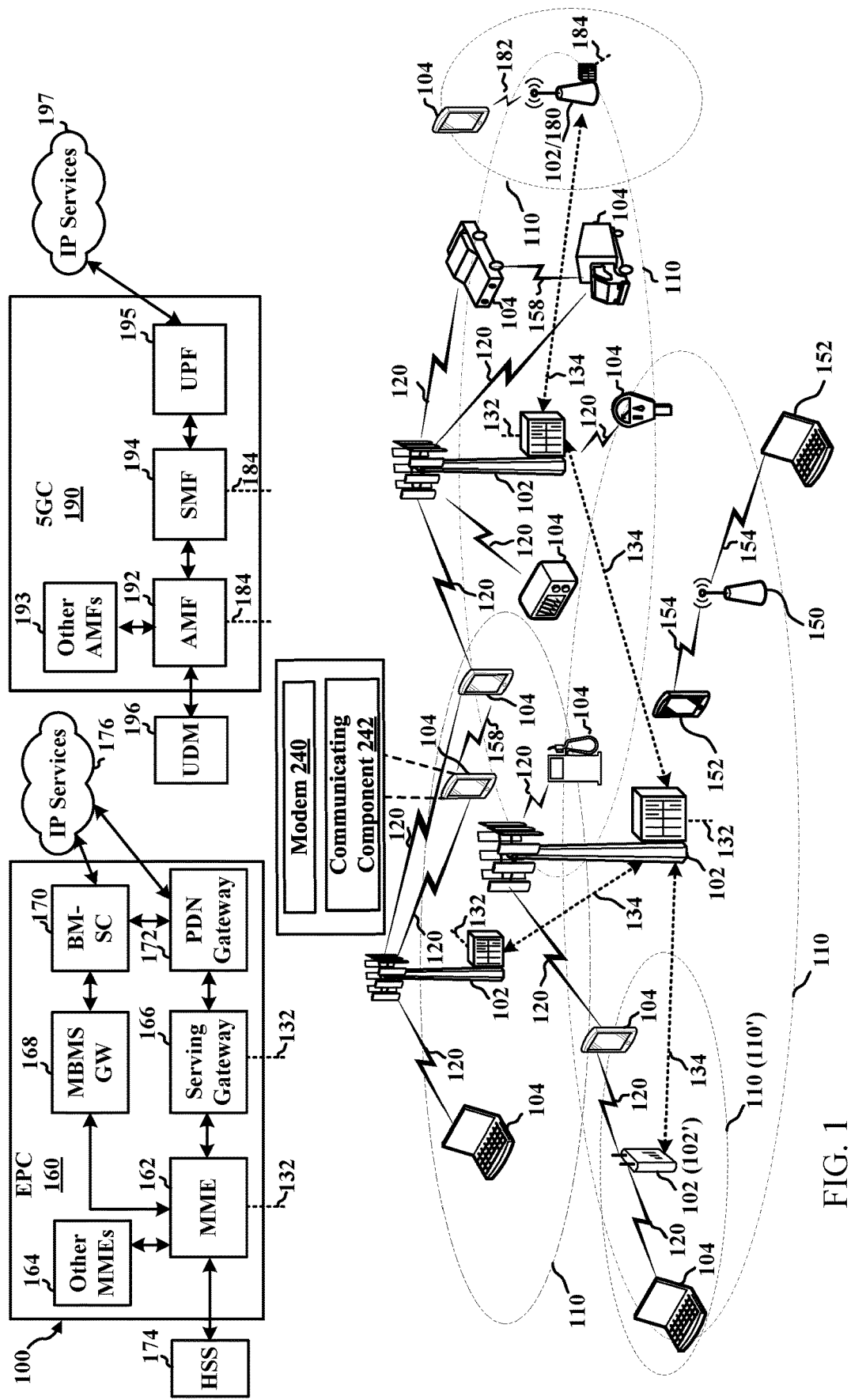
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to measuring beams for communicating with nodes in wireless communications. In some wireless communication technologies, such as fifth generation (5G) new radio (NR), nodes can periodically measure beams that are transmitted by other nodes to determine whether a different beam is more desirable as a serving beam than a current serving beam. In an aspect, measuring beams can include receiving, at a receiver node, signals transmitted by a transmitting node where the transmitted signals are transmitted by the transmitting node by using antenna resources beamformed in a spatial direction. Similarly, measuring beams can include receiving, at the receiver node, signals transmitted by the transmitting node and using antenna resources at the receiver node that are beamformed in a spatial direction. The receiving node can accordingly determine one or more of which transmit (TX) beam by the transmitting node, is desired and which receive (RX) beam to use in communicating with the transmit node based on the measurements. These beams can be collectively referred to as a "transmit/receive beam pair," or "beam pair."

In an aspect, the receiving node can indicate, to the transmitting node, at least one of the desired beam pair, the desired transmit beam, or the receive beam, and the transmitting node can use this information to beamform antenna resources for communicating with the receiving node. In one example, the "receiving node" can similarly transmit communications to the "transmitting node," and the "transmitting node" can receive the communications from the "receiving node." In this example, the "receiving node" can use a similar beam as the determined RX beam to transmit communications to the "transmitting node," and the "transmitting node" can use a similar beam as the indicated desired TX beam to receive communications from the "receiving node."

In NR, in an aspect, a node can be configured to perform serving beam sweeps to measure beams from a serving node according to a first periodicity, such to possibly consider other serving beams for serving beam switch. A beam sweep can generally refer to a procedure where at least a receive node can receive signals from a transmit node using all available receive beams to determine a desirable receive beam. In addition, in one aspect, as part of a beam sweep, the transmit node can transmit using all available transmit beams where the receive node measures each transmit beam using each receive beam to determine a desirable transmit/receive beam pair. In either case, performing serving beam sweeps in this regard can align a node to a desirable beam or beam pair depending on a position of the node. In an aspect, rotation or other mobility of the node (and thus of its associated antenna resource) with respect to a transmitting node or associated transmit beam can result in change of a desirable receive beam at the node, and thus periodically performing the serving beam sweep can help to ensure the node is communicating with a serving node using at least a desirable receive beam.

In NR, the node can also be configured to perform inter-frequency beam sweeps to measure beams from other nodes operating on other frequencies. This procedure, however, may occur at a second periodicity, which can be larger than the first periodicity associated with serving beam sweep (e.g., such that the inter-frequency beam sweep occurs less frequently), as measuring inter-frequency beams can be more disruptive to communications. In an aspect, inter-frequency measuring may require a measurement gap to allow switching antenna resources to another frequency to receive and measure inter-frequency beams. For inter-frequency measurements, the node can loop through all the set of RX beams to identify the one with the most desirable (e.g., highest power or quality) signal in order to report to the network. Depending on the number of RX beams that the node supports, to go through the whole set of RX beams could take quite a long time (in the order of hundreds of milliseconds) and the corresponding measurement report may be sent late to network, and/or may downgrade the mobility performance. In scenarios where there is a constant device rotation, the node could take even longer, depending on the RX beam selected to be used during the gap. As such, rotation of the node may also affect which inter-frequency beams are determined to be desirable for the node. Indeed, there can be at least two variables that could impact the performance: the order the node selects the RX beams for measurement during the gap as well as the possible rotation of the node relative to a transmitting node or associated TX beam.

Aspects described herein generally relate to using information from serving beam sweeps to assist in performing an inter-frequency procedure, where the inter-frequency procedure may include inter-frequency beam sweeps, determining inter-frequency beams to use in wireless communications, and/or the like. In an aspect, as serving cell measurements can go through a much faster scan (e.g., as they do not require gap and periodicity is generally shorter than gap periodicity), the serving beam sweeps happen on a faster pace or periodicity than the inter-frequency procedure(s). Thus, assistance from the serving beam sweeps can be fed to, or otherwise used in, inter-frequency procedure(s) for selecting an inter-frequency RX beam. In an aspect, where a node performs a serving beam switch to select a different serving beam as part of a serving beam sweep or other beam determining procedure, the node can apply spatial correlation information associated with the original serving beam and the new serving beam to make a beam determination in an inter-frequency procedure. In an aspect, based on the serving beam spatial correlation, the node can determine to switch a beam to measure next in an inter-frequency beam sweep. This can save from measuring beams with similar spatial correlation that have already been determined as undesirable, which can save time during the inter-frequency procedure. In another aspect, where an inter-frequency beam is selected and/or is being used (e.g., in handover), the node can switch the inter-frequency beam based on the serving beam spatial correlation. This can allow the node to use a desirable inter-frequency beam despite rotation or other movement of the node.

The described features will be presented in more detail below with reference to FIGS. 1-6.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an aspect, the base stations 102 may also include gNBs 180, as described further herein. In one aspect, some nodes of the wireless communication system may have a modem 240 and communicating component 242 for performing serving beam sweeps and inter-frequency procedures, as described herein. Though a UE 104 is shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. In an aspect, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another aspect, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as in an aspect, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. In an aspect, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an aspect, communicating component 242 of a UE 104 can beamform antenna resources to generate a receive beam for receiving communications from a base station 102 and/or other nodes. Communicating component 242 can periodically perform a serving beam sweep procedure to determine a desirable serving beam to use in receiving communications from a serving cell (e.g., from a base station 102), as small movements and/or rotation of the UE 104 with respect to the serving cell can impact reception using a given receive beam. In addition, communicating component 242 can perform inter-frequency procedures that may use receive beams for receiving inter-frequency signals, and communicating component 242 can use information from more frequently performed serving beam sweeps in performing the inter-frequency procedures, as described further herein. Using the serving beam sweep information in performing the inter-frequency procedure may allow for increasing efficiency in performing the inter-frequency procedure and/or may improve quality of communications for the inter-frequency procedure.

Figure 2:
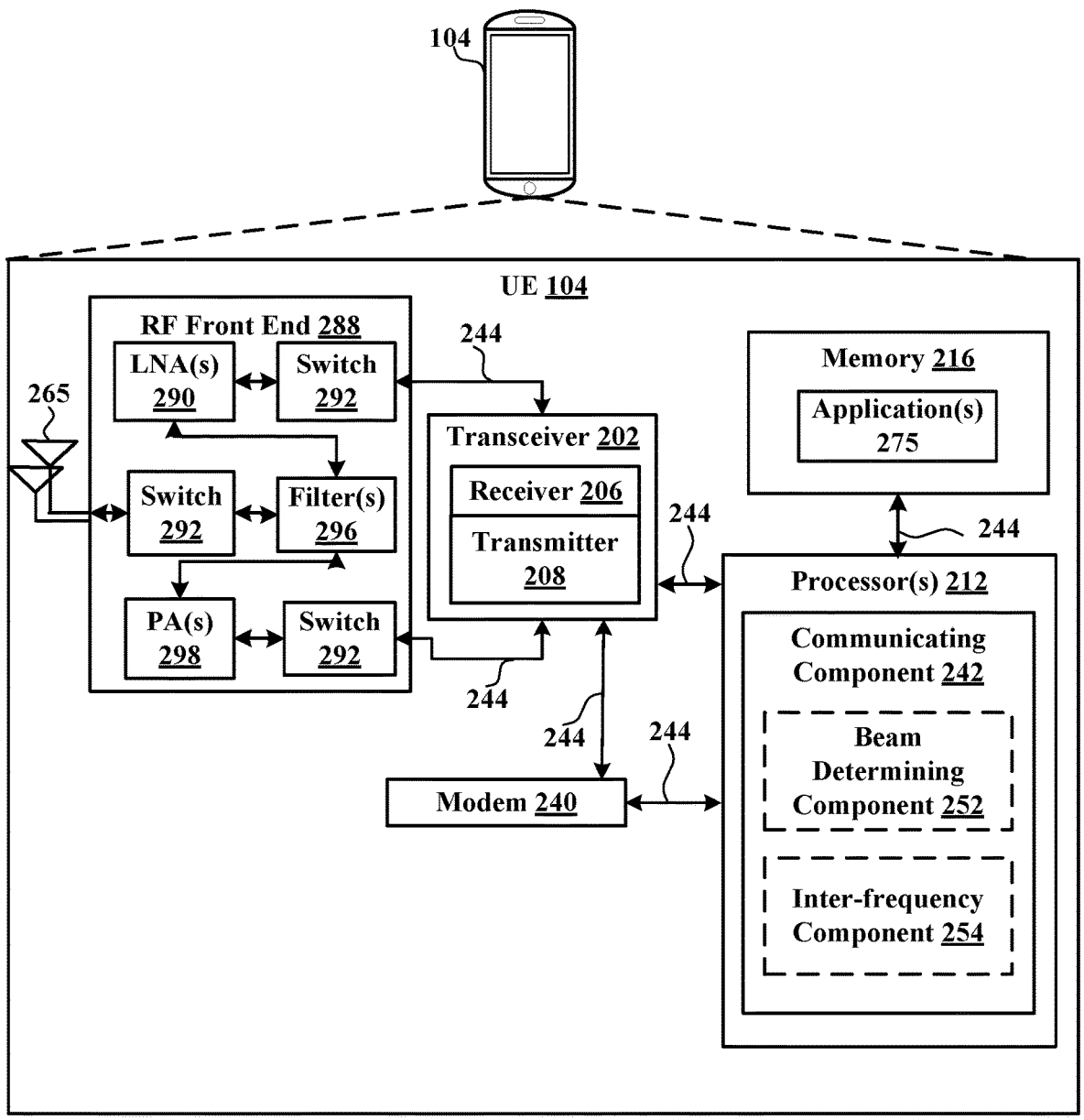
FIG. 2 is a block diagram illustrating an aspect of a UE, in accordance with various aspects of the present disclosure.
Figure 3:
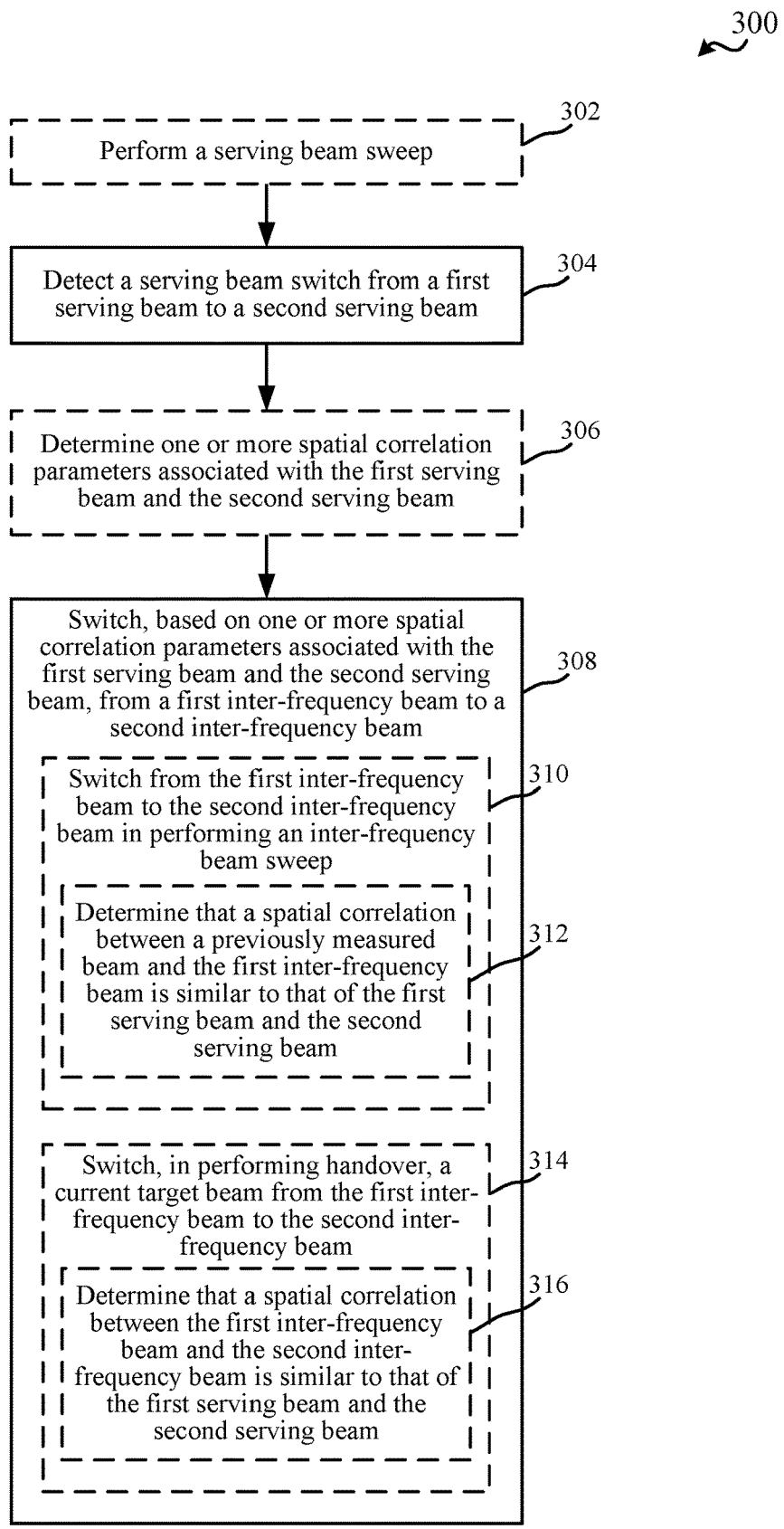
FIG. 3 is a flow chart illustrating an aspect of a method for switching inter-frequency beams based on a serving beam switch, in accordance with various aspects of the present disclosure.

Turning now to FIGS. 2-6, aspects are depicted with reference to one or more components and one or more methods that may perform the actions or operations described herein, where aspects in dashed line may be optional. Although the operations described below in FIG. 3 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one aspect of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for performing serving beam sweeps and inter-frequency procedures, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. In an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, in an aspect, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, in an aspect, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, in an aspect, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, in an aspect, one or more filters 296 can be used by RF front end 288 to filter a received signal to obtain an input RF signal. Similarly, in an aspect, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, in an aspect, one or more base stations 102 or one or more cells associated with one or more base stations 102. In an aspect, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a beam determining component 252 for performing serving beam sweeps to determine a serving beam to use in communicating with a serving cell, and/or an inter-frequency component 254 for performing one or more inter-frequency procedures based on using information obtained as part of switching a serving beam, as described herein.

In an aspect, the processor(s) 212 may correspond to one or more of the processors described in connection with the UE in FIG. 6. Similarly, the memory 216 may correspond to the memory described in connection with the UE in FIG. 6.

FIG. 3 illustrates a flow chart of an aspect of a method 300 for performing beam switching and inter-frequency procedures. In an aspect, a UE (e.g., UE 104) can perform the functions described in method 300 using one or more of the components described in FIGS. 1 and 2, though other types of devices that perform serving beam switching can similarly perform method 300.

In method 300, optionally at Block 302, a UE can perform a serving beam sweep. In an aspect, beam determining component 252, e.g., in conjunction with processor(s) 212, memory 216, transceiver 202, communicating component 242, etc., can perform the serving beam sweep. In an aspect, communicating component 242 can beamform antenna resources (e.g., components of the RF front end 288 and/or the like) at the UE 104 in a spatial direction based on a determined beam to receive beams or other signals from another node (e.g., a base station 102). Communicating component 242 can be capable of beamforming for multiple receive beams in multiple spatial directions by selectively applying power to the antenna resources. Accordingly, in an aspect, beam determining component 252 can periodically perform a beam sweep to determine a desirable beam. In an aspect, where communicating component 242 is communicating with a serving node (e.g., base station 102), the serving beam sweep can include beam determining component 252 selecting multiple beams, based on which communicating component 242 can beamform antenna resources, in an attempt to receive signals from the serving node and determine which receive beam (and/or which transmit beam) is desirable. Beam determining component 252 can accordingly determine which of the multiple receive beams (and/or transmit beams) is desirable. In an aspect, beam determining component 252 can cause communicating component 242 to use the determined receive beam in receiving communications from the serving node (e.g., from base station 102). In another aspect, beam determining component 252 can notify the serving node (e.g., base station 102) of the determined receive beam to be used (and/or the transmit beam to use) for communications between the base station 102 and the UE 104.

As described, in an aspect, movement or rotation of the UE 104 can cause movement of the antenna resources and movement of the receive beam with respect to the serving node (e.g., base station 102) and/or the corresponding transmit beam, such that a different receive beam may become more desirable (e.g., by having a stronger or higher quality received signal). Accordingly, beam determining component 252 can periodically perform the serving beam sweep in an attempt to ensure the UE 104 is communicating with the serving node using a desirable beam, where the desirable beam can be determined to result in desirable signal properties (e.g., when compared to one or more thresholds) at the UE 104. In an aspect, as a result of performing the serving beam sweep, beam determining component 252 may determine to select a new serving beam for communications with the serving node (e.g., with base station 102).

In method 300, at Block 304, the UE can detect a serving beam switch from a first serving beam to a second serving beam. In an aspect, beam determining component 252, e.g., in conjunction with processor(s) 212, memory 216, transceiver 202, communicating component 242, etc., can detect the serving beam switch from the first serving beam to the second serving beam (or other intra-frequency procedure related to the first and second serving beams). In an aspect, beam determining component 252 can detect the serving beam switch as part of a serving beam sweep (e.g., as described above in Block 302), such as where, as part of the beam sweep, beam determining component 252 determines that another RX beam is more desirable than a current RX beam. In another aspect, beam determining component 252 can detect the serving beam switch as part of another procedure, such as an indication received from another node to switch the beam (e.g., an indication received from a transmitting node, such as a base station 102), an indication received from an application executing on UE 104, etc. indicating to switch to a certain serving beam.

In an aspect, whether part of a beam sweep or other procedure, beam determining component 252 can determine to switch the serving beam from a current serving beam (the first beam) to a different serving beam (the second beam) based at least in part on at least one of comparing signal properties of the beams to one another and/or to certain thresholds, comparing a difference in signal properties between the beams to one or more thresholds, etc. In an aspect, the signal properties can include signal strength or quality measurements (e.g., RSSI, RSRP, RSRQ, SINR, etc.) of signals received over the beams. In any case, switching from one serving beam to another can be an indication of movement or rotation of the UE 104 causing one serving beam to become more desirable than a current serving beam. As described above and further herein, the switching of serving beam can imply that other beams are more desirable than current beams in other procedures as well, such as in inter-frequency procedures.

In method 300, optionally at Block 306, the UE can determine one or more spatial correlation parameters associated with the first serving beam and the second serving beam. In an aspect, beam determining component 252, e.g., in conjunction with processor(s) 212, memory 216, transceiver 202, communicating component 242, etc., can determine the one or more spatial correlation parameters associated with the first serving beam and the second serving beam. In an aspect, beam determining component 252 can determine the one or more spatial correlation parameters based on detecting the serving beam switch. In an aspect, the spatial correlation parameters can refer to a directional difference (e.g., an angular difference, which may be measured or indicated in space) between the first serving beam and the second serving beam.

In an aspect, beam determining component 252 can determine spatial correlation parameters of the first and second serving beams, which may be specified in a configuration associated with receive beams that the UE 104 can use/generate. In an aspect, the configuration may include, for each beam, a beam identifier, beamforming parameters (e.g., a beamforming matrix) or other information for generating the beam, a directional indication of the beam (e.g., a relative angle offset from a previous beam, a relative angle offset from a physical or imaginary point of the UE 104, or other relative change in direction, etc.), and/or the like. In another aspect, beam determining component 252 can determine the directional information of the beam based on the beamforming matrix or other parameters used to generate the beam. In any case, beam determining component 252 can determine the directional difference between the first and second serving beams based on the directional information for each of the first and second serving beams. In one specific aspect, beam determining component 252 can subtract an angular offset of the second serving beam (e.g., as indicated in a configuration as a relative angle offset from a previous beam) from an angular offset of the first serving beam (e.g., as indicated in a configuration as a relative angle offset from a previous beam) to determine an angular difference between the beams.

In method 300, at Block 308, the UE can switch, based on one or more spatial correlation parameters associated with the first serving beam and the second serving beam, from a first inter-frequency beam to a second inter-frequency beam. In an aspect, inter-frequency component 254, e.g., in conjunction with processor(s) 212, memory 216, transceiver 202, communicating component 242, etc., can switch, based on one or more spatial correlation parameters associated with the first serving beam and the second serving beam, from the first inter-frequency beam to the second inter-frequency beam. In an aspect, inter-frequency component 254 can switch from the first inter-frequency beam to the second inter-frequency beam as part of an inter-frequency procedure, such as an inter-frequency beam sweep, inter-frequency handover, etc.

In an aspect, in switching from the first inter-frequency beam to the second inter-frequency beam at Block 308, optionally at Block 310, the UE can switch from the first inter-frequency beam to the second inter-frequency beam in performing an inter-frequency beam sweep. In an aspect, inter-frequency component 254, e.g., in conjunction with processor(s) 212, memory 216, transceiver 202, communicating component 242, etc., can switch from the first inter-frequency beam to the second inter-frequency beam in performing the inter-frequency beam sweep. In an aspect, performing the inter-frequency beam sweep can generally include measuring each receive beam for receiving inter-frequency signals over a period of time. In an aspect, measurement gaps can be configured (e.g., by the base station 102) for performing the inter-frequency measurements. In this aspect, inter-frequency component 254 can switch from a first inter-frequency beam to be measured in a measurement gap to a second inter-frequency beam based at least in part on determination of spatial correlation parameters of the first and second serving beams, as described.

In an aspect, in switching from the first inter-frequency beam to the second inter-frequency beam in performing the inter-frequency beam sweep at Block 310, optionally at Block 312, the UE can determine that a spatial correlation between a previously measured beam and the first inter-frequency beam is similar to that of the first serving beam and the second serving beam. In an aspect, inter-frequency component 254, e.g., in conjunction with processor(s) 212, memory 216, transceiver 202, communicating component 242, etc., can determine that the spatial correlation between the previously measured beam and the first inter-frequency beam is similar (e.g., has similar values) to that of the first serving beam and the second serving beam. In one aspect, inter-frequency component 254 can determine that a first angular difference between the previously measured beam and the first inter-frequency beam is similar (e.g., within a threshold angular offset) to a second angular offset between the first serving beam and the second serving beam. In addition, in an aspect, inter-frequency component 254 can switch from the first inter-frequency to the second inter-frequency beam also based at least in part on determining that a signal strength or quality associated with the previously measured beam was below a threshold level.

In an aspect, based on determining the spatial difference between the first and second serving beams, inter-frequency component 254 can determine whether a beam having similar spatial direction as a current inter-frequency beam to be measured (or a similar beam) was previously measured as part of the inter-frequency beam sweep before the serving beam switch. If so, inter-frequency component 254 can skip measuring this current inter-frequency beam (e.g., where the measurement of the beam having the similar spatial direction was below a threshold or otherwise) and instead measure a next beam. Skipping measurement of beams known to be in an undesirable spatial direction, in this regard, can make the inter-frequency beam sweep more efficient. In one aspect, where there are multiple beams between the first and second serving beams, inter-frequency component 254 may possibly skip measurement of multiple beams between the first inter-frequency beam (e.g., the current inter-frequency beam to be measured in inter-frequency beam sweep) and the second inter-frequency beam that is actually measured. An aspect of the inter-frequency beam sweep is illustrated in FIG. 4.

Figure 4:
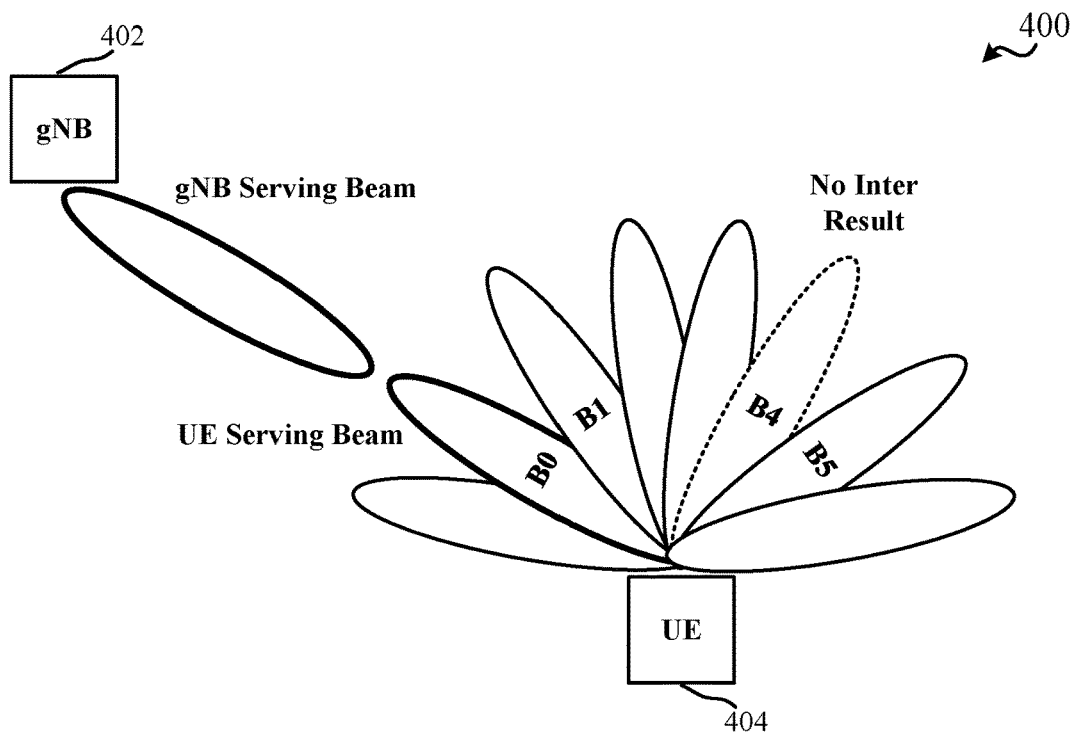
FIG. 4 illustrates an aspect of systems for switching inter-frequency beams in an inter-frequency beam sweep, in accordance with various aspects of the present disclosure.
Figure 4:
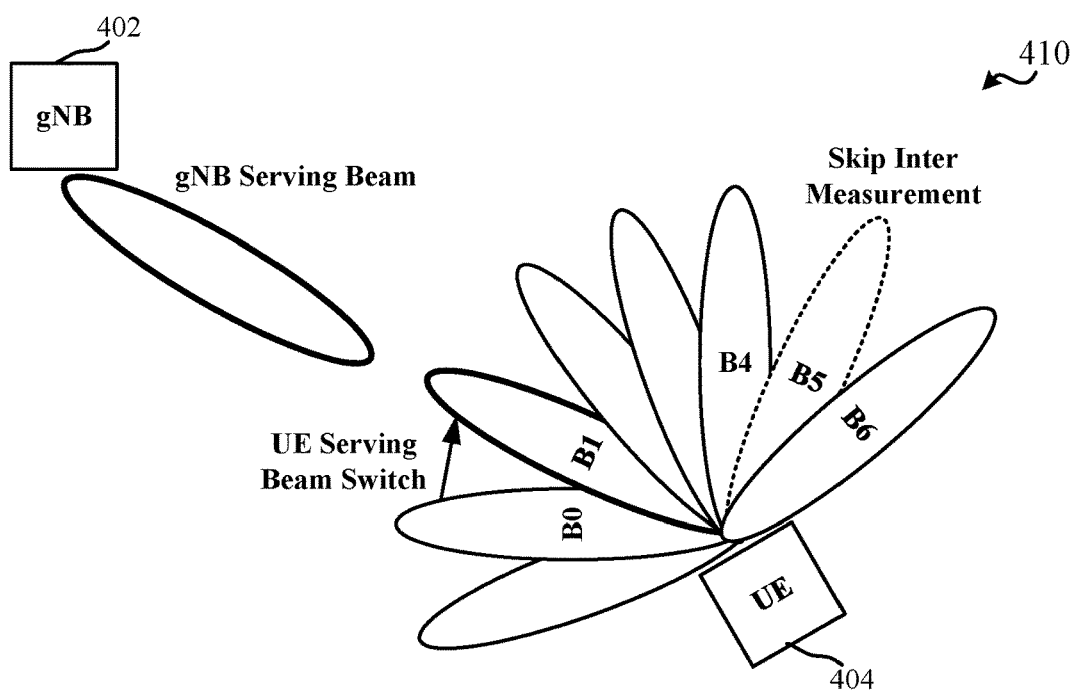

FIG. 4 illustrates an aspect of a system 400 at a first time instant where a UE 404 communicates with a gNB 402 based on a serving beam. In an aspect, gNB 402 can have a serving beam that it uses for communicating with the UE 404, and UE 404 can use beam B0 as its serving beam for communicating with the gNB 402. As described, UE 404 can periodically perform a serving beam sweep to measure signal strength at each of the beams (including B0, B1, B4, B5, and the other depicted beams) to determine which beam to use to communicate with the serving gNB. Moreover, as described, UE 404 can periodically perform an inter-frequency beam sweep to measure other cells on other frequencies, which may typically also use B0, B1, B4, B5 and the other depicted beams. The inter-frequency beam sweep may occur less frequently than the serving beam sweep, as inter-frequency beam sweeps can require measurement gaps or otherwise disrupt communications. In the depicted aspect, in system 400, UE 404 can have last measured beam B4 as part of the inter-frequency beam sweep and can have determined that beam B4 had no inter-frequency measurement result (e.g., signal strength below a threshold) and thus should not be considered for inter-frequency handover or other communication procedures.

In system 410, at a second time instant, the UE 404 can have rotated and can have performed a serving beam sweep after rotation, which can cause the UE 404 to switch to beam B1 as the UE serving beam based on B1 having improved signal quality/strength (e.g., due to improved line-of-sight) than the previous serving beam B0. Based on the serving beam switch, the UE 404 can determine that a first spatial correlation between beam B4 (e.g., as the previously measured inter-frequency beam) and beam B5 (e.g., as the first inter-frequency beam) is similar to a second spatial correlation between beam B0 (e.g., as the serving beam before the serving beam sweep) and beam B1 (e.g., as the serving beam after the serving beam sweep). In an aspect, this can include UE 404 determining that an angular offset, difference in beam index, etc. between beam B4 and B5 is similar (e.g., equal or within a threshold difference) to an angular offset, difference in beam index, etc. between beam B0 and B1. Based on this determination, in an aspect, where beam B5 is the next beam to measure in the inter-frequency beam sweep (after beam B4 was previously measured), UE 404 can skip measurement of beam B5 (e.g., and/or can move to beam B6) in the next measurement gap for the inter-frequency beam sweep. In an aspect, as beam B0 before the rotation and beam B1 after the rotation have similar spatial correlation, this may indicate that beam B4 before the rotation and beam B5 after the rotation have a similar spatial correlation as well (and thus beam B5 after the rotation can have no inter-frequency result). As described, this determination can be based on comparing spatial parameters/difference (e.g., whether by angular offset, difference in beam index, etc.) of B0 and B1 to B4 and B5.

Specifically, in the aspect of FIG. 4, assume before starting measurement gaps, that the UE has best serving RX beam B0. In a first gap, shown in system 400, the UE 404 can arbitrarily select B4 for inter-frequency search (e.g., inter-frequency beam sweep) and did not determine desirable results. Before the second measurement gap starts, the UE 404 can detect that it has rotated due to the results in the serving RX beam scan (e.g., serving beam sweep, which can occur on a faster pace than measurement gaps). If UE 404 serving RX beam now switches to B1, in system 410, which is to the right of B0, then UE 404 can take this assessment and not choose B5 for the measurement gap as it would be scanning the same/similar position as B4 in the first gap. Based on orientation and placements of the RX beams within the UE 404, UE 404 can select what to use in the measurement gap to find the inter frequency results, as described above.

In another aspect, in switching from the first inter-frequency beam to the second inter-frequency beam at Block 308, optionally at Block 314, the UE can switch, in performing handover, a current target beam from the first inter-frequency beam to the second inter-frequency beam. In an aspect, inter-frequency component 254, e.g., in conjunction with processor(s) 212, memory 216, transceiver 202, communicating component 242, etc., can switch, in performing handover, the current target beam from the first inter-frequency beam to the second inter-frequency beam. In an aspect, the inter-frequency handover can include determining the target beam of another cell for communicating with until handover is completed to handover communications from a serving cell (e.g., based on a serving beam) to the target cell (e.g., based on a determined target beam). In an aspect, the target beam may be determined as part of an inter-frequency beam sweep, as described above. In this aspect, inter-frequency component 254 can switch the target beam from a first inter-frequency beam to a second inter-frequency beam based at least in part on determination of spatial correlation parameters of the first and second serving beams of the serving beam switch, as described. In addition, in an aspect, inter-frequency component 254 can switch the target beam during handover or after handover is complete. In one aspect, in switching the target beam, inter-frequency component 254 can switch the target beam to the second inter-frequency beam for communicating one or more messages that may relate to the handover and/or following handover.

In an aspect, in switching from the first inter-frequency beam to the second inter-frequency beam in performing the handover at Block 314, optionally at Block 316, the UE can determine that a spatial correlation between the first inter-frequency beam and the second inter-frequency beam is similar to that of the first serving beam and the second serving beam. In an aspect, inter-frequency component 254, e.g., in conjunction with processor(s) 212, memory 216, transceiver 202, communicating component 242, etc., can determine that the spatial correlation between the first inter-frequency beam and the second inter-frequency beam is similar (e.g., has similar values) to that of the first serving beam and the second serving beam. In an aspect, based on determining a difference in spatial correlation of the first and second serving beams, inter-frequency component 254 can determine the second inter-frequency beam, to which to switch the target beam, is of a similar difference in spatial correlation with respect to the first inter-frequency beam (e.g., the original target beam). This switch can improve communication quality with the target cell. An aspect of the inter-frequency beam sweep is illustrated in FIG. 5.

Figure 5:
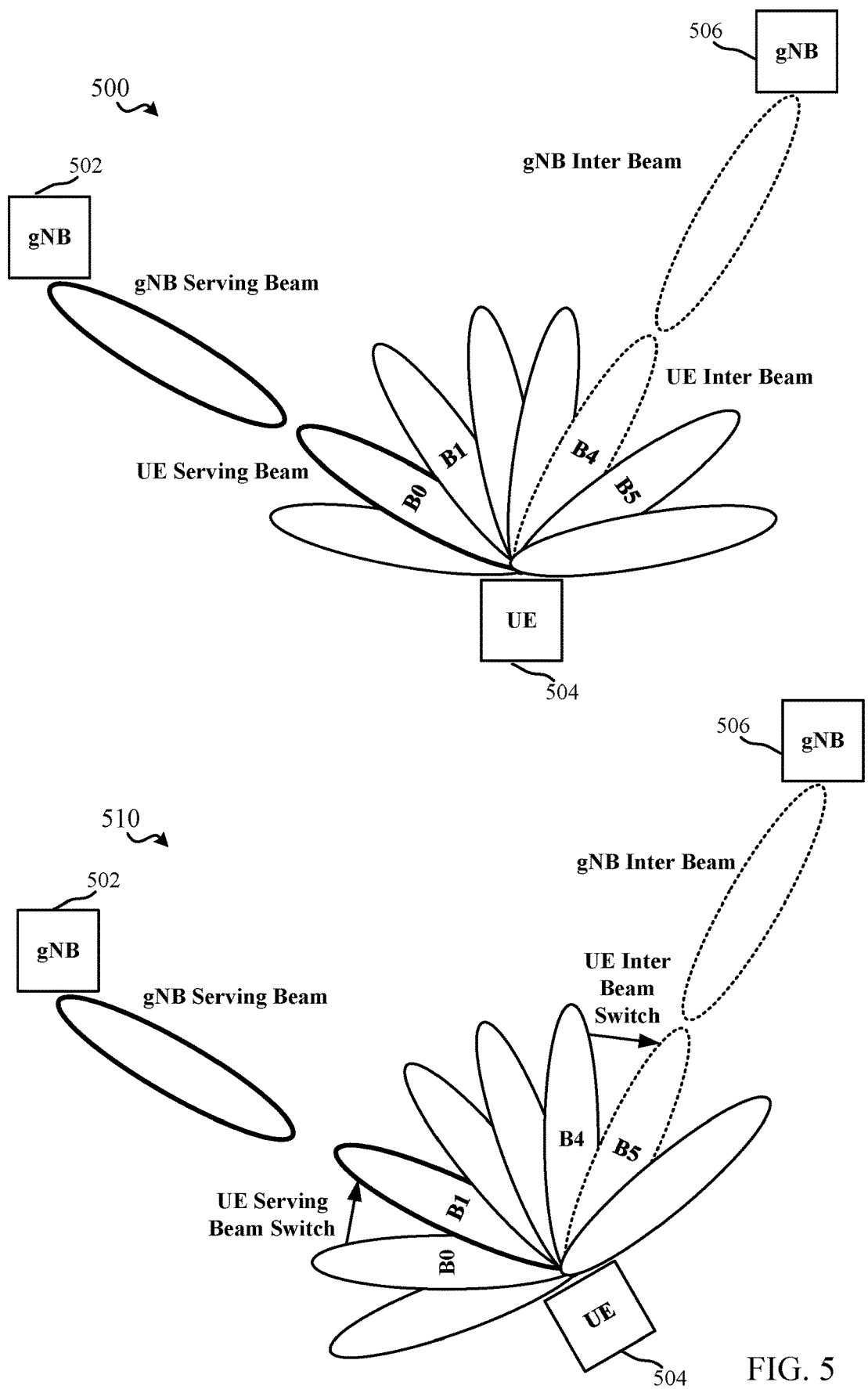
FIG. 5 illustrates an aspect of systems for switching inter-frequency beams in an inter-frequency handover, in accordance with various aspects of the present disclosure.

FIG. 5 illustrates an aspect of a system 500 at a first time instant where a UE 504 communicates with a gNB 502 based on a serving beam. In an aspect, gNB 502 can have a serving beam that it uses for communicating with the UE 504, and UE 504 can use beam B0 as its serving beam for communicating with the gNB 502. As described, UE 504 can periodically perform a serving beam sweep to measure signal strength at each of the beams (including B0, B1, B4, B5, and the other depicted beams) to determine which beam to use to communicate with the serving gNB. Moreover, as described, UE 504 can communicate with another gNB 506 using an inter-frequency beam B4. In an aspect, using inter-frequency beam B4 may be part of a handover procedure to handover UE 504 communications from the gNB 502 to gNB 506. In any case, UE 504 can be communicating with the gNB 506 using beam B4 when the serving beam sweep is performed.

In system 510, at a second time instant, the UE 504 can have rotated and can have performed a serving beam sweep after rotation, which can cause the UE 504 to switch from beam B0 to beam B1 as the UE serving beam based on beam B1 having improved signal quality/strength (e.g., due to improved line-of-sight) than the previous serving beam B0. Based on the serving beam switch, the UE 504 can determine to also switch the inter-frequency beam used to communicate with the gNB 506. In an aspect, UE 504 can determine to switch the inter-frequency beam from beam B4 to B5 based on determining that a difference in spatial correlation between beams B4 and B5 (e.g., between the first inter-frequency beam and the second inter-frequency beam) is similar to (e.g., equal to or within a threshold of) the difference in spatial correlation between B0 and B1 (e.g., the first and second serving beam). As described, this determination can be based on comparing spatial parameters or difference in parameter values of B0 and B1 to B4 and B5, where the spatial parameters can include an angular offset of the beams, a beam index of the beams, etc.

Specifically, in the aspect of FIG. 5, assume the UE 504 already found the best RX beam for the inter-frequency cell. Once it is identified, the UE 504 can mark its positional and orientation correlation with current serving RX beam. As shown at system 510, B4 is the best inter-frequency beam, B0 is the serving beam. When serving RX beam switch (e.g., serving beam sweep) happens, the best RX beam of inter-frequency could potentially switch similarly based on the correlation. As shown in system 510, serving beam switched from B0 to B1, and accordingly, the best inter-frequency beam is switched from B4 to B5, as described above. This can be beneficial in handover scenarios as after UE 504 reports measurement report to the network, as UE rotation could happen, and this correlation could be used to perform another gap to ensure the best RX beam is used post-handover (or during handover).

In any case, switching inter-frequency beams based on serving beam switching can provide many benefits. In an aspect, this may facilitate quickly finding a best RX beam for each inter frequency, may trigger measurement report earlier to network and improve the mobility performance, may use less measurement gaps for each inter frequency, may improve the overall inter frequency performance, may use less measurement gaps, may use less downlink interrupt, may increase downlink throughput, etc., may use less measurement gaps such that UE has longer duration for sleep, improve the power consumption, and/or may use best RX beam during handover, shortening time taken to completely handoff to new cell, etc.

Figure 6:
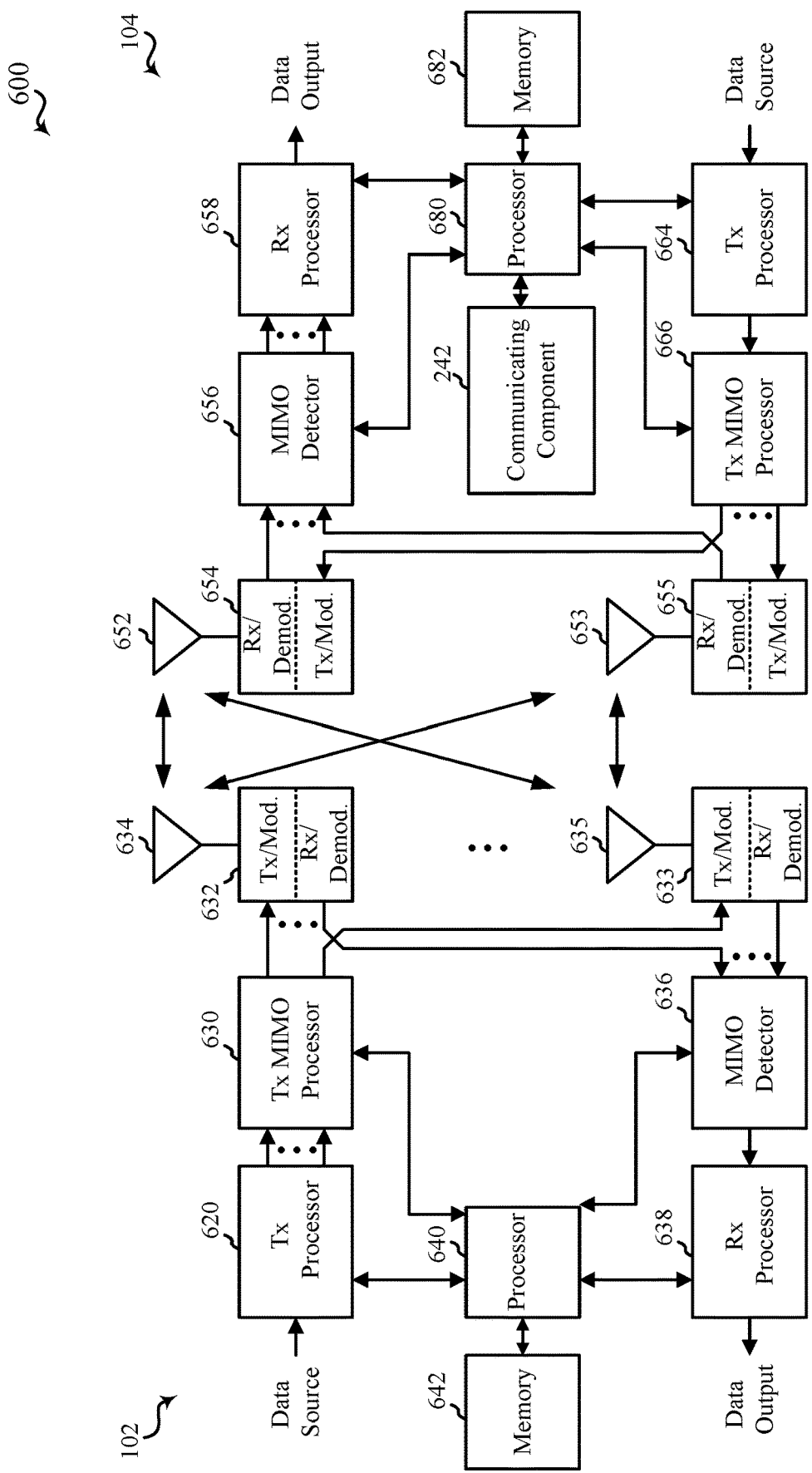
FIG. 6 is a block diagram illustrating an example of a MIMO communication system including a base station and a UE, in accordance with various aspects of the present disclosure.

FIG. 6 is a block diagram of a MIMO communication system 600 including a base station 102 and a UE 104, in accordance with various aspects of the present disclosure. The MIMO communication system 600 may illustrate aspects of the wireless communication access network 100 described with reference to FIG. 1. The base station 102 may be an aspect of aspects of the base station 102 described with reference to FIG. 1. In addition, the UE 104 can communicate with another UE over sidelink resources using similar functionality described herein with respect to UE 104 and base station 102 communications.

The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. In an aspect, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one aspect, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 600. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is a method for wireless communication including detecting a serving beam switch from a first serving beam to a second serving beam, and switching, based on one or more spatial correlation parameters associated with the first serving beam and the second serving beam, from a first inter-frequency beam to a second inter-frequency beam to use in an inter-frequency procedure.

In Aspect 2, the method of Aspect 1 includes determining, based on the serving beam switch, the one or more spatial correlation parameters between the first serving beam and the second serving beam.

In Aspect 3, the method of any of Aspects 1 or 2 includes wherein the detecting is associated with an intra-frequency procedure.

In Aspect 4, the method of any of Aspects 1 to 3 includes wherein the one or more spatial correlation parameters indicate a relative change in direction between beams.

In Aspect 5, the method of any of Aspects 1 to 4 includes wherein the inter-frequency procedure includes performing an inter-frequency beam sweep over each of multiple beams, wherein switching from the first inter-frequency beam to the second inter-frequency beam is based at least in part on a determination that the one or more spatial correlation parameters between a previously measured beam and the first inter-frequency beam have similar values as between the first serving beam and the second serving beam.

In Aspect 6, the method of Aspect 5 includes wherein the first inter-frequency beam corresponds to a current measurement gap during the inter-frequency beam sweep, and wherein switching from the first inter-frequency beam to the second inter-frequency beam comprises skipping measurement of the first inter-frequency beam to instead measure the second inter-frequency beam during the current measurement gap.

In Aspect 7, the method of any of Aspects 1 to 6 includes wherein the inter-frequency procedure includes inter-frequency handover based on the first inter-frequency beam, wherein switching from the first inter-frequency beam to the second inter-frequency beam is based at least in part on a determination that the one or more spatial correlation parameters between the first inter-frequency beam and the second inter-frequency beam have similar values as between the first serving beam and the second serving beam.

In Aspect 8, the method of Aspect 7 includes wherein switching from the first inter-frequency beam to the second inter-frequency beam comprises selecting the second inter-frequency beam instead of the first inter-frequency beam for communicating one or more messages as part of the inter-frequency handover.

In Aspect 9, the method of any of Aspects 1 to 8 includes wherein detecting the serving beam switch is based on a rotation of a device that performs the serving beam switch.

In Aspect 10, the method of any of Aspects 1 to 9 includes performing a serving beam sweep over each of multiple beams, wherein the serving beam switch results from detecting the second serving beam during the serving beam sweep.

Aspect 11 is an apparatus for wireless communication including a transceiver, a memory configured to store instructions, and one or more processors communicatively coupled with the transceiver and the memory, wherein the one or more processors are configured to execute the instructions to perform the operations of one or more methods in any of Aspects 1 to 10.

Aspect 12 is an apparatus for wireless communication including means for performing the operations of one or more methods in any of Aspects 1 to 10.

Aspect 13 is a computer-readable medium including code executable by one or more processors to perform the operations of one or more methods in any of Aspects 1 to 10.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:

performing, based on an intra-frequency beam sweep, a serving beam switch from a first serving beam used in communicating with a serving node to a second serving beam to use in communicating with the serving node; and switching, for an inter-frequency procedure, based on performing the serving beam switch, and based on one or more spatial correlation parameters associated with the first serving beam and the second serving beam, from a first inter-frequency beam to a second inter-frequency beam to use in performing the inter-frequency procedure.

2. The method of claim 1, further comprising determining, based on the serving beam switch, the one or more spatial correlation parameters between the first serving beam and the second serving beam.

3. The method of claim 1, wherein the performing the serving beam switch is associated with an intra-frequency procedure.

4. The method of claim 1, wherein the one or more spatial correlation parameters indicate a relative change in spatial direction between beams.

5. The method of claim 1, wherein the inter-frequency procedure includes performing an inter-frequency beam sweep over each of multiple beams, wherein switching from the first inter-frequency beam to the second inter-frequency beam is based at least in part on a determination that one or more first values of the one or more spatial correlation parameters between a previously measured beam and the first inter-frequency beam are within a threshold difference of one or more second values of the one or more spatial correlation parameters associated with the first serving beam and the second serving beam.

6. The method of claim 5, wherein the first inter-frequency beam corresponds to a current measurement gap during the inter-frequency beam sweep, and wherein switching from the first inter-frequency beam to the second inter-frequency beam includes skipping measurement of the first inter-frequency beam to instead measure the second inter-frequency beam during the current measurement gap.

7. The method of claim 1, wherein the inter-frequency procedure includes inter-frequency handover based on the first inter-frequency beam, wherein switching from the first inter-frequency beam to the second inter-frequency beam is based at least in part on a determination that one or more first values of the one or more spatial correlation parameters between the first inter-frequency beam and the second inter-frequency beam are within a threshold difference of one or more second values of the one or more spatial correlation parameters associated with the first serving beam and the second serving beam.

8. The method of claim 7, wherein switching from the first inter-frequency beam to the second inter-frequency beam includes selecting the second inter-frequency beam instead of the first inter-frequency beam for communicating one or more messages as part of the inter-frequency handover.

9. The method of claim 1, wherein the performing the serving beam switch is based on a rotation of a device that performs the serving beam switch.

10. The method of claim 1, further comprising performing a serving beam sweep over each of multiple beams, wherein the serving beam switch results from detecting the second serving beam during the serving beam sweep.

11. An apparatus for wireless communication, comprising:
a transceiver;
a memory configured to store instructions; and
one or more processors communicatively coupled with the transceiver and the memory, wherein the one or more processors are configured to:
perform, based on an intra-frequency beam sweep, a serving beam switch from a first serving beam used in communicating with a serving node to a second serving beam to use in communicating with the serving node; and
switch, for an inter-frequency procedure, based on performing the serving beam switch, and based on one or more spatial correlation parameters associated with the first serving beam and the second serving beam, from a first inter-frequency beam to a second inter-frequency beam to use in performing the inter-frequency procedure.

12. The apparatus of claim 11, wherein the one or more processors are further configured to determine, based on the serving beam switch, the one or more spatial correlation parameters between the first serving beam and the second serving beam.

13. The apparatus of claim 11, wherein the one or more processors are configured to perform the serving beam switch associated with an intra-frequency procedure.

14. The apparatus of claim 11, wherein the one or more spatial correlation parameters indicate a relative change in spatial direction between beams.

15. The apparatus of claim 11, wherein the inter-frequency procedure includes performing an inter-frequency beam sweep over each of multiple beams, wherein wherein the one or more processors are configured to switch from the first inter-frequency beam to the second inter-frequency beam based at least in part on a determination that one or more first values of the one or more spatial correlation parameters between a previously measured beam and the first inter-frequency beam are within a threshold difference of one or more second values of the one or more spatial correlation parameters associated with the first serving beam and the second serving beam.

16. The apparatus of claim 15, wherein the first inter-frequency beam corresponds to a current measurement gap during the inter-frequency beam sweep, and wherein the one or more processors are configured to switch from the first inter-frequency beam to the second inter-frequency beam at least in part by skipping measurement of the first inter-frequency beam to instead measure the second inter-frequency beam during the current measurement gap.

17. The apparatus of claim 11, wherein the inter-frequency procedure includes inter-frequency handover based on the first inter-frequency beam, wherein the one or more processors are configured to switch from the first inter-frequency beam to the second inter-frequency beam based at least in part on a determination that one or more first values of the one or more spatial correlation parameters between the first inter-frequency beam and the second inter-frequency beam are within a threshold difference of one or more second values of the one or more spatial correlation parameters associated with the first serving beam and the second serving beam.

18. The apparatus of claim 17, wherein the one or more processors are configured to switch from the first inter-frequency beam to the second inter-frequency beam at least in part by selecting the second inter-frequency beam instead of the first inter-frequency beam for communicating one or more messages as part of the inter-frequency handover.

19. The apparatus of claim 11, wherein the one or more processors are configured to perform the serving beam switch based on a rotation of a device that performs the serving beam switch.

20. The apparatus of claim 11, wherein the one or more processors are configured to perform a serving beam sweep over each of multiple beams, wherein the serving beam switch results from detecting the second serving beam during the serving beam sweep.

21. An apparatus for wireless communication, comprising:
means for performing, based on an intra-frequency beam sweep, a serving beam switch from a first serving beam used in communicating with a serving node to a second serving beam to use in communicating with the serving node; and
means for switching, for an inter-frequency procedure, based on performing the serving beam switch, and based on one or more spatial correlation parameters associated with the first serving beam and the second serving beam, from a first inter-frequency beam to a second inter-frequency beam to use in performing the inter-frequency procedure.

22. The apparatus of claim 21, further comprising means for determining, based on the serving beam switch, the one or more spatial correlation parameters between the first serving beam and the second serving beam.

23. The apparatus of claim 21, wherein the means for performing performs the serving beam switch is associated with an intra-frequency procedure.

24. The apparatus of claim 21, wherein the one or more spatial correlation parameters indicate a relative change in spatial direction between beams.

25. The apparatus of claim 21, wherein the inter-frequency procedure includes performing an inter-frequency beam sweep over each of multiple beams, wherein the means for switching switches from the first inter-frequency beam to the second inter-frequency beam based at least in part on a determination that one or more first values of the one or more spatial correlation parameters between a previously measured beam and the first inter-frequency beam are within a threshold difference of one or more second values of the one or more spatial correlation parameters associated with the first serving beam and the second serving beam.

26. A non-transitory computer-readable medium, comprising code executable by one or more processors for wireless communication, the code comprises code for:

performing, based on an intra-frequency beam sweep, a serving beam switch from a first serving beam used in communicating with a serving node to a second serving beam to use in communicating with the serving node; and switching, for an inter-frequency procedure, based on performing the serving beam switch, and based on one or more spatial correlation parameters associated with the first serving beam and the second serving beam, from a first inter-frequency beam to a second inter-frequency beam to use in performing the inter-frequency procedure.

27. The non-transitory computer-readable medium of claim 26, further comprising code for determining, based on the serving beam switch, the one or more spatial correlation parameters between the first serving beam and the second serving beam.

28. The non-transitory computer-readable medium of claim 26, wherein the code for performing performs the serving beam switch is associated with an intra-frequency procedure.

29. The non-transitory computer-readable medium of claim 26, wherein the one or more spatial correlation parameters indicate a relative change in spatial direction between beams.

30. The non-transitory computer-readable medium of claim 26, wherein the inter-frequency procedure includes performing an inter-frequency beam sweep over each of multiple beams, wherein the code for switching switches from the first inter-frequency beam to the second inter-frequency beam based at least in part on a determination that one or more first values of the one or more spatial correlation parameters between a previously measured beam and the first inter-frequency beam are within a threshold difference of one or more second values of the one or more spatial correlation parameters associated with the first serving beam and the second serving beam.

\* \* \* \* \*